(12) United States Patent
Nagata

(10) Patent No.: US 6,814,393 B2
(45) Date of Patent: Nov. 9, 2004

(54) SEALING STRIP AND VEHICLE PANEL ASSEMBLY

(75) Inventor: Hideyuki Nagata, West Bloomfield, MI (US)

(73) Assignee: Toyoda Gosei Co., Ltd. (JP)

( * ) Notice: Subject to any disclaimer, the term of this patent is extended or adjusted under 35 U.S.C. 154(b) by 0 days.

(21) Appl. No.: 10/395,819

(22) Filed: Mar. 24, 2003

(65) Prior Publication Data

US 2004/0189044 A1 Sep. 30, 2004

(51) Int. Cl.$^7$ .............................................. B60J 10/08
(52) U.S. Cl. ................. 296/146.9; 49/498.1; 296/146.5
(58) Field of Search ............................... 296/146.9, 213, 296/154, 146.5; 49/490.1, 374, 404, 440, 489.1, 498.1, 495.1

(56) References Cited

U.S. PATENT DOCUMENTS

| | | | |
|---|---|---|---|
| 2,622,286 A | | 12/1952 | Beck |
| 2,941,838 A | | 6/1960 | Wernig |
| 4,026,598 A | | 5/1977 | Koike |
| 4,457,111 A | | 7/1984 | Koike |
| 4,549,761 A | * | 10/1985 | Lee et al. ................ 296/146.9 |
| 5,024,480 A | | 6/1991 | Petrelli |
| 5,649,405 A | * | 7/1997 | Morihara et al. ......... 296/146.9 |
| 5,992,021 A | | 11/1999 | Takeda et al. |
| 6,007,140 A | * | 12/1999 | Heitmann et al. ........ 296/146.9 |
| 6,131,342 A | * | 10/2000 | Miyamoto et al. .......... 49/498.1 |
| 6,386,619 B1 | * | 5/2002 | Tsuchida ................. 296/146.9 |
| 6,393,766 B2 | * | 5/2002 | Nozaki et al. ............. 49/498.1 |
| 6,405,489 B1 | * | 6/2002 | Miura ....................... 49/498.1 |
| 6,499,257 B1 | * | 12/2002 | Tsuchida et al. ........... 49/498.1 |
| 6,536,833 B2 | * | 3/2003 | Nozaki ..................... 296/146.9 |
| 6,539,671 B2 | * | 4/2003 | Yamaguchi et al. ........ 49/498.1 |
| 6,601,346 B2 | * | 8/2003 | Nozaki ....................... 49/498.1 |
| 6,679,003 B2 | * | 1/2004 | Nozaki et al. .............. 49/495.1 |
| 2002/0027378 A1 | * | 3/2002 | Nozaki ..................... 296/146.9 |

FOREIGN PATENT DOCUMENTS

| | | |
|---|---|---|
| EP | 0 322 949 A1 | 7/1989 |
| EP | 0 201 223 B1 | 3/1990 |
| JP | 59-6125 | 1/1984 |
| JP | 2-200519 | 8/1990 |
| JP | 2-227328 | 9/1990 |
| JP | 5-208615 | 8/1993 |
| JP | 6-106994 | 4/1994 |

OTHER PUBLICATIONS

One page illustration of prior art sealing strips (undated).

* cited by examiner

*Primary Examiner*—Kiran Patel
(74) *Attorney, Agent, or Firm*—Dickinson Wright PLLC

(57) ABSTRACT

The sealing strip of the present invention includes a retention section having an upper hub, a first retention leg, a second retention leg rearward of the first retention leg, an upper recess rearward of the upper hub, and first and second lower recesses. The first lower recess is positioned between the first and second retention legs and the second lower recess is positioned rearward of the second retention leg. The sealing strip also includes a sealing section formed with the retention section. The invention is also related to a vehicle panel assembly including a first panel having a channel, a second panel, and a sealing strip coupled to the first panel. The sealing strip includes a retention section having an upper hub, a first retention leg, a second retention leg, an upper recess, and first and second lower recesses. The sealing strip again includes a sealing section which is integrally formed with the retention section.

9 Claims, 2 Drawing Sheets

SEALING STRIP AND VEHICLE PANEL ASSEMBLY

BACKGROUND OF THE INVENTION

1. Field of the Invention

The present invention relates to a sealing strip having a retention section for coupling the strip to a first panel and a sealing section configured to sealingly contact a second panel.

2. Description of the Related Art

Numerous sealing strips are commonly used in the art as an environmental barrier. In the automotive industry, sealing strips are used in numerous locations including between the vehicle door and roof side part of the body. Sealing strips of the type described herein must provide a sufficiently strong coupling of the retention section to one of the panels and an effective seal. The retention strength of the sealing strip is generally improved by increasing the rigidity or density of the retention section material. However, rigid and dense material may adversely impact ease of installation as well as reduce the effectiveness of the seals. In an attempt to obtain a suitable balance of these factors, many manufacturers commonly use different materials for the sealing and retention sections. Other approaches include using reinforcement in the retention section to improve rigidity and retention integrity and/or providing hollow chambers in a rigid or dense retention section material to facilitate installation. While these approaches may be suitable for many applications, the art has not adequately addressed the need to further improve sealing strip retention characteristics without increasing the manufacturing complexity of the strip.

SUMMARY OF THE INVENTION

In view of the above, the present invention relates to an improved retention section configuration that enhances sealing strip retention characteristics, improves the ease of assembly, and reduces manufacturing costs. The improved retention characteristics may be capitalized upon through the use of a sealing strip that is integrally formed using a material of suitable density.

The sealing strip of the present invention includes a retention section having a hub, a first retention leg, a second retention leg rearward (e.g., positioned at an inner-side of a vehicle cabin) of the first retention leg, and first and second recesses. The first recess is positioned between the first and second retention legs and the second recess is positioned rearward of the second retention leg. The sealing strip also includes a sealing section fixed to the retention section. The invention also relates to a vehicle panel sealing assembly including a first panel having a channel, a second panel, and a sealing strip coupled to the first panel. The sealing strip again includes a sealing section and a retention section. The retention section has an upper hub, a first retention leg, a second retention leg rearward of the first retention leg, and first and second recesses. The first recess is positioned between the first and second legs and the second recess is positioned rearward of the second leg.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
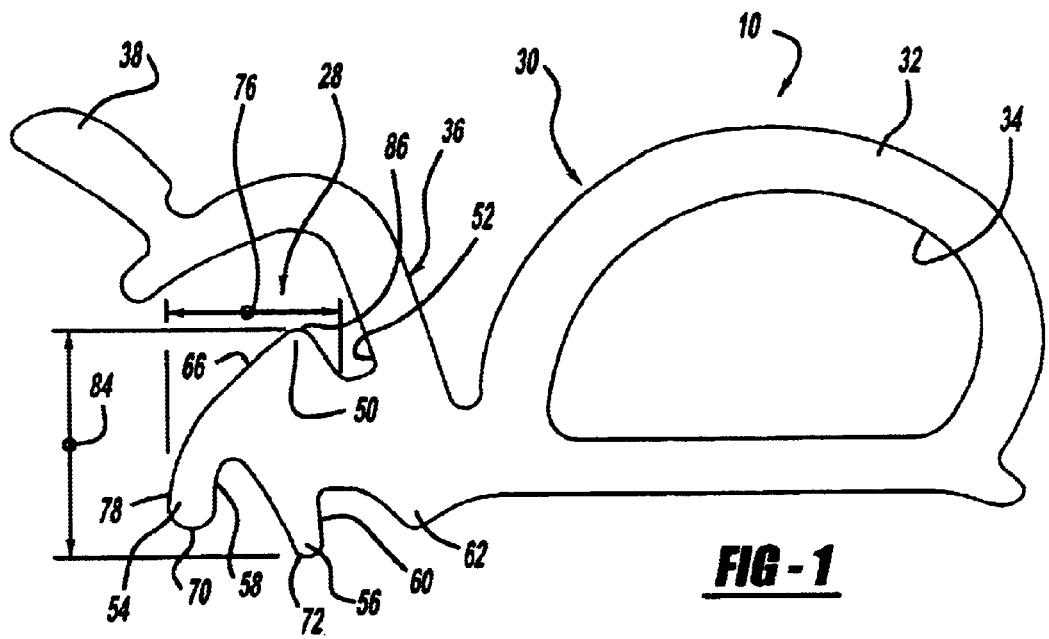
FIG. 1 is a cross-section of the sealing strip of the present invention.
Figure 2:
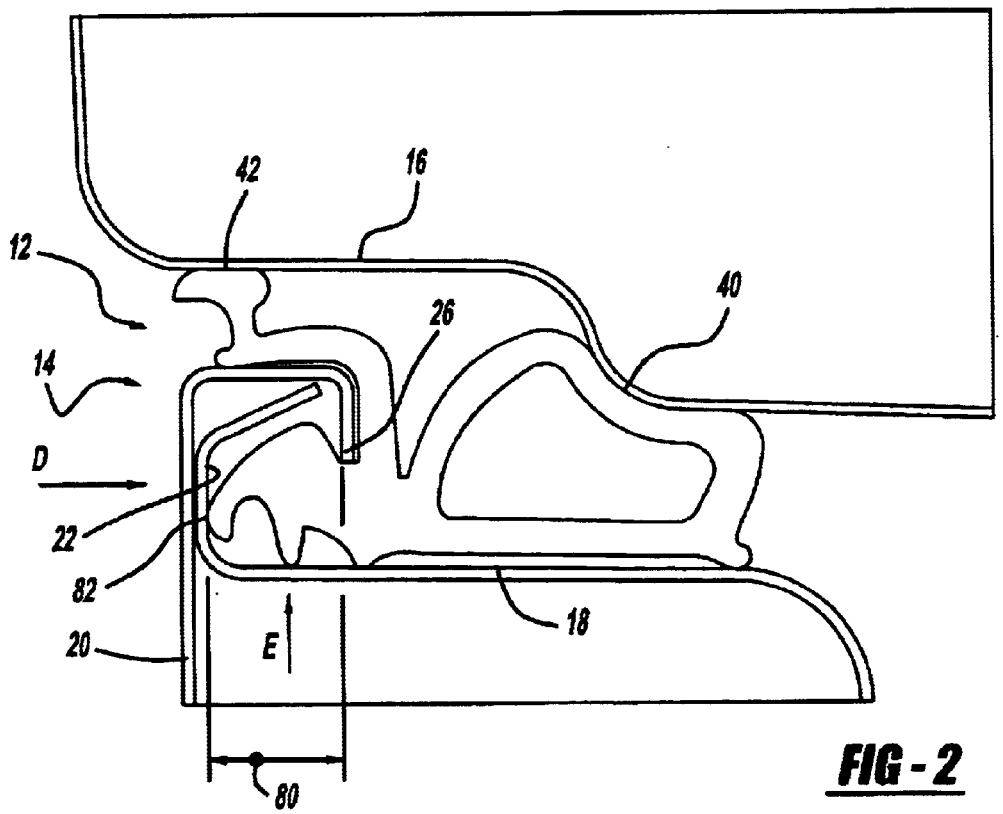
FIG. 2 is a cross-section of a vehicle panel sealing assembly with the sealing strip shown in FIG. 1 installed therein.
Figure 3:
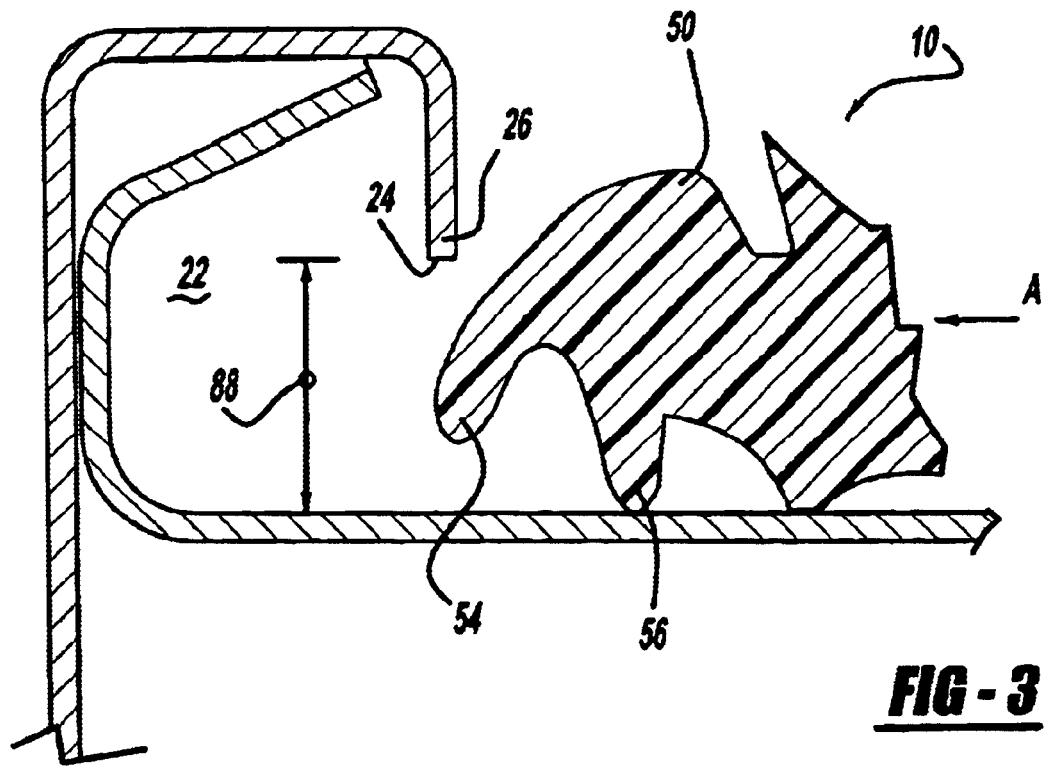
FIG. 3 is an enlarged partial cross-sectional view illustrating the installation of the sealing strip in the vehicle panel assembly.
Figure 4:
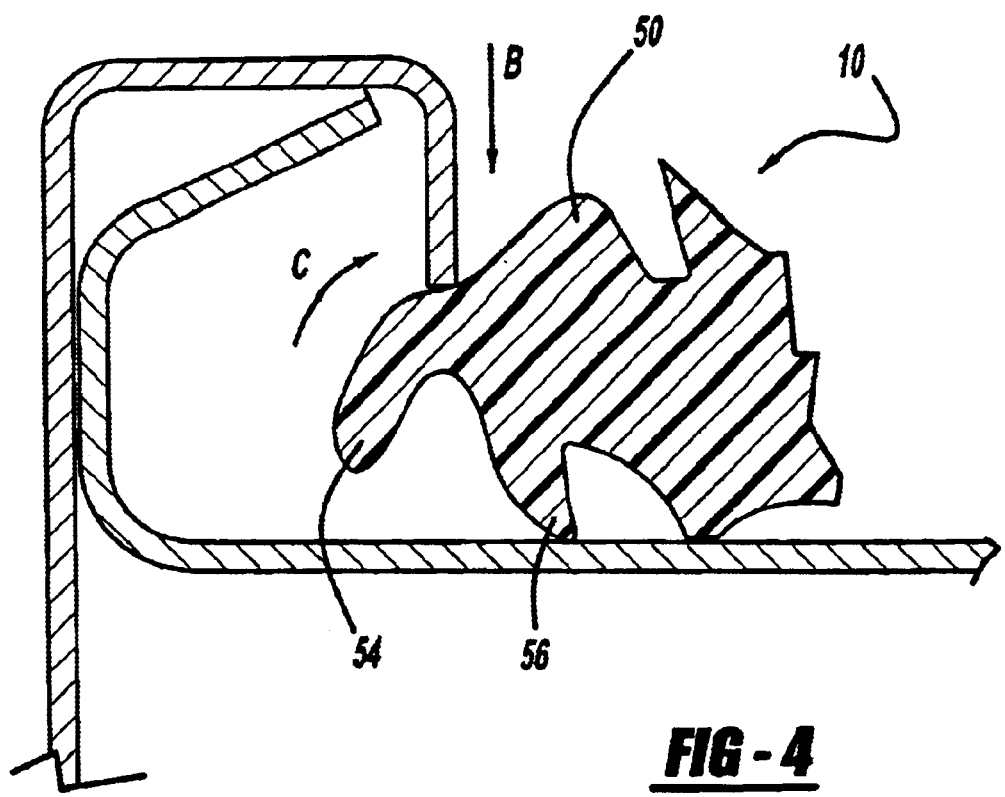
FIG. 4 is an enlarged partial cross-sectional view of the installation of the sealing strip in the vehicle sealing assembly.

A weather strip or sealing strip 10 for a vehicle panel sealing assembly 12 (FIG. 2) is illustrated in FIGS. 1–4. In use, as is shown in FIGS. 2–4, the sealing strip 10 is coupled to one of a first panel, e.g., door frame 14, and configured to seal against a second panel, e.g., roof frame side portion 16. The door frame 14 includes inner and outer panels 18 and 20 coupled to one another and defining a channel 22 having an opening 24 (FIG. 3) bounded on its upper end by a frame lip or flange 26. The sealing strip 10 includes a retention section 28 and a sealing section 30 which are preferably, though not necessarily, integrally formed (e.g., extruded) to improve manufacturing ease and reduce costs. The configuration of the retention section 28 provides numerous advantages over conventional sealing strips including facilitating the integral forming of the strip, improving the ease with which the sealing strip is installed in the channel 22, and enhancing the retention of the sealing strip within the channel. Notwithstanding the illustrative use of the sealing strip in a door/roof sealing application, those skilled in the art will appreciate that the invention is equally suited for other vehicle sealing applications.

As noted above, attempts to obtain suitable sealing and retention in vehicle sealing strips have led manufacturers to use different materials for the sealing and retention sections, include reinforcement in the retention section to improve rigidity and retention integrity, and/or include hollow chambers in the retention section. However, each of these approaches increase the manufacturing complexity of the strip. Conversely, the sealing strip 10 of the present invention includes an enhanced retention section configuration that improves the sealing strip retention characteristics. These improved characteristics may be beneficial for multiple material uses as well as manufacturing the strip through a single extrusion operation. While the specific type of material for each of these uses may vary, the retention and sealing sections of the illustrated embodiment are preferably formed using a single material of suitable density. Particularly suitable materials include valcunizable elastomers and thermoplastic elastomers such as sponge or foamed elastomers. By way of further illustration, the material is preferably an EPDM sponge having a density in the range of about 0.5 to about 0.7 g/cm$^3$. Other suitable materials include thermoplastic elastomers, such as those having a density in the range of about 0.8 to about 1.0 g/cm$^3$. These materials have been found to be particularly suitable for the illustrated application as they exhibit sufficient density and rigidity for retention within the channel 22 and sufficient flexibility and resiliency to facilitate installation and sealing. Notwithstanding this discussion of particularly suitable materials and densities, those skilled in the art will appreciate that other materials and/or densities may be used without departing from the scope of the invention defined by the appended claims.

Returning now to a description of the features of the sealing strip, the sealing strip has a generally tubular and longitudinal form extending perpendicular to the cross-sectional view illustrated in FIG. 1 and includes the aforementioned sealing and retention sections. The sealing section 30 may have a variety of configurations capable of providing one or more seal areas between the first and second panels. By way of example, the sealing section 30 is shown to include a sealing bulb 32, having a longitudinal hollow chamber 34, and a sealing arm 36 defining a sealing lip 38. The sealing bulb 32 and lip 38 are positioned to provide first and second seals 40 and 42, respectively, against the roof frame 16 (such as the illustrated roof side portion) when the door is in its closed position.

The retention section 28 includes an upper hub or protrusion 50, an upper recess 52 between the hub and the sealing arm 36, a first retention leg 54, a second retention leg 56 positioned rearward of the first leg, a first lower recess 58 positioned between the first and second retention legs, and a second lower recess 60 positioned rearward of the second retention leg. A third leg 62 is positioned rearward of the second lower recess 60. The upper recess 52 accommodates the deflection of the upper hub 50 during installation and receives the frame lip 26 when installed. The first and second lower recesses 58 and 60 accommodate the deflection of the retention legs as described below. The hub 50 is preferably a solid element formed of a single material and having a uniform density. That is, the hub preferably does not include a chamber or hollow cavity. The hub 50 includes a leading contact surface 66 that is preferably convex to facilitate installation.

The first retention leg 54 also includes a lower surface 70 that is preferably raised relative to a lower surface 72 of the second retention leg 56 so as to correspond to the contour of the inner door panel 18. The upper recess 52 is spaced a distance 76 from a front surface 78 of the first retention leg 54. The distance 76 is preferably greater than the space 80 between the frame lip 26 and an inner panel engagement surface 82 so as to ensure deflection of the first retention leg 54 when the sealing strip 10 is installed. Further, the retention section 28 defines a distance 84 between an upper hub surface 86 and the lowest of the lower surfaces 70 and 72 of the first and second retention legs. This distance 84 is greater than the height 88 of the channel opening 24 so as to ensure the desired displacement of the sealing strip during installation as described below. Notwithstanding the configuration of the illustrated embodiment, those skilled in the art will appreciate that the configuration of the retention section and its constituent components may be modified without departing from the scope of the invention defined by the appended claims.

During installation (see FIGS. 3 and 4), the sealing strip 10 is aligned with the channel as shown in FIG. 3 and displaced in the direction of arrow "A" so that the upper hub 50 engages the frame lip 26. Further displacement of the sealing strip causes a downward deflection of the retention section 28 (arrow "B" in FIG. 4), including rotational of the hub 50 in the direction of arrow "C" and deflection of the second retention leg 56. When the hub 50 clears the frame lip 26 the resiliency of the second retention leg 56 causes upward and rotational movement of the retention section so that the hub 50 hooks the frame lip 26 (FIG. 2) within the upper recess 52 (FIG. 2). When the sealing strip 10 is fully installed as shown in FIG. 2, the retention section 28 is disposed and retained in the channel 22 with the first retention leg 54 deflected to create a horizontal biasing force in the direction of arrow "D". This biasing force enhances the secure retention of the retention section 28 in the channel 22. In the illustrated embodiment, the retention may be further enhanced by sizing the second retention leg 56 such that this leg is also in a deflected state when installed thereby creating a vertical biasing force in the direction of arrow "E".

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A sealing strip comprising: a retention section including a body, a first retention leg having one end formed integral with said body and second free end, a lower recess positioned rearward of and adjacent to said first retention leg to permit rearward deflection of said first retention leg, an upper hub rearward of and above said first retention leg, an upper recess positioned rearward of the adjacent said upper hub, said upper recess having an open upper end to permit rearward deflection of said upper hub and an arcuate frame lip located within upper recess between said upper hub and a sealing section.

2. The sealing strip of claim 1 wherein said retention section is solid in cross section and is formed of a single material.

3. The sealing strip of claim 2 wherein the material is an elastomer having a density in the range of about 0.5 g/cm$^3$ to about 1.0 g/cm$^3$.

4. The sealing strip of claim 2 wherein the material is a thermoplastic elastomer having a density in the range of about 0.8 to about 1.0 g/cm$^3$.

5. The sealing strip of claim 3 wherein the material is an EPDM having a density in the range of about 0.5 to about 0.7 g/cm$^3$.

6. The sealing strip of claim 1 wherein said retention section further includes
   a second retention leg rearward of said first lower recess and extending below said first retention leg, and
   a second lower recess rearward of said second retention leg.

7. The sealing strip of claim 6 wherein said second retention leg is positioned forward of said upper recess.

8. The sealing strip of claim 6 wherein said retention section is solid in cross section and is formed of a single elastomer material having a density in the range of about 0.5 g/cm$^3$ to about 1.0 g/cm$^3$.

9. The sealing strip of claim 1 wherein said open upper end of said upper recess faces a first direction and said lower recess has an opening facing a direction substantially opposite said first direction.

* * * * *